US012175481B2

(12) United States Patent
Benjamin

(10) Patent No.: US 12,175,481 B2
(45) Date of Patent: *Dec. 24, 2024

(54) SYSTEM AND METHOD FOR TRANSACTION LEARNING

(71) Applicant: Capital One Services, LLC, McLean, VA (US)

(72) Inventor: Moshe Benjamin, Midlothian, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 1087 days.

This patent is subject to a terminal disclaimer.

(21) Appl. No.: 16/935,834

(22) Filed: Jul. 22, 2020

(65) Prior Publication Data

US 2020/0349590 A1 Nov. 5, 2020

Related U.S. Application Data

(63) Continuation of application No. 14/929,522, filed on Nov. 2, 2015, now Pat. No. 10,762,512.

(Continued)

(51) Int. Cl.
G06Q 30/02 (2023.01)
G06N 5/025 (2023.01)

(52) U.S. Cl.
CPC .............. G06Q 30/02 (2013.01); G06N 5/025 (2013.01)

(58) Field of Classification Search
CPC ........ G06N 5/025; G06Q 30/02; G06Q 40/02; G06Q 30/00
See application file for complete search history.

(56) References Cited

U.S. PATENT DOCUMENTS 7,640,511 B1 * 12/2009 Keel ...................... G06Q 10/10
707/999.102
7,865,412 B1 * 1/2011 Weiss ..................... G06Q 30/06
705/30

(Continued)

OTHER PUBLICATIONS

Lee, Kwan Hong, et al. "Connected consumption: The hidden networks of consumption." 2009 6th IEEE Consumer Communications and Networking Conference. IEEE, 2009. (Year: 2009).*

(Continued)

*Primary Examiner* — Randall K. Baldwin
(74) *Attorney, Agent, or Firm* — TROUTMAN PEPPER HAMILTON SANDERS LLP; Christopher J. Forstner; John A. Morrissett

(57) ABSTRACT

A system and method a method for providing for providing personalized transaction learning and tagging. The method may include tagging transactions associated with one or more financial accounts belonging to an account holder, whether the account holder be the primary, secondary, or a related account holder, such as a spouse, parent, guardian, and the like. The method may include linking all accounts belong to and/or associated with an account holder and receiving transaction data from each linked account. Once the system receives the transaction data, the system may query the account holder for input regarding the transaction data. The input may include tagging the transaction as belonging to a particular spending category and/or affirming or denying that the transaction belongs to a particular category. The system may receive and create categories based on account holder data, demographic data, credit data, and account holder profile data.

16 Claims, 7 Drawing Sheets

Related U.S. Application Data

(60) Provisional application No. 62/073,135, filed on Oct. 31, 2014.

(56) References Cited

U.S. PATENT DOCUMENTS

| | | | | |
|---|---|---|---|---|
| 8,447,666 | B1* | 5/2013 | Keld | G06Q 20/227 705/16 |
| 10,134,023 | B2* | 11/2018 | Zhgeng | G06Q 20/227 |
| 10,762,512 | B2* | 9/2020 | Benjamin | G06Q 30/02 |
| 2002/0126153 | A1* | 9/2002 | Withers | G06F 3/0482 715/773 |
| 2003/0105711 | A1* | 6/2003 | O'Neil | G06Q 40/00 705/39 |
| 2008/0195438 | A1* | 8/2008 | Manfredi | G06Q 40/02 |
| 2009/0276368 | A1* | 11/2009 | Martin | G06Q 40/02 705/36 R |
| 2010/0257006 | A1* | 10/2010 | Quadracci | G06N 3/044 707/E17.046 |
| 2011/0106607 | A1* | 5/2011 | Alfonso | G06Q 30/02 705/35 |
| 2012/0130869 | A1* | 5/2012 | Shergill | G06Q 40/12 705/30 |
| 2014/0006198 | A1 | 1/2014 | Daly et al. | |
| 2014/0012691 | A1* | 1/2014 | Hanson | G06Q 20/42 705/44 |
| 2014/0214652 | A1* | 7/2014 | Zheng | G06Q 20/227 705/39 |
| 2015/0088714 | A1* | 3/2015 | Votaw | G06Q 50/01 705/35 |
| 2015/0088718 | A1* | 3/2015 | Votaw | G06Q 50/01 705/35 |

OTHER PUBLICATIONS

Anonymously, Disclosed. "Automatic and Customizable Cash Management Visualizer", Published: Nov. 8, 2008, An IP.com Prior Art Database (PAD) Technical Disclosure, IP.com No. IPCOM000176197D, https://ip.com/IPCOM/000176197 (Year: 2008).*

* cited by examiner

SYSTEM AND METHOD FOR TRANSACTION LEARNING

CROSS REFERENCE TO RELATED APPLICATIONS

This application is a continuation of, and claims priority under 35 U.S.C. § 120 to, U.S. patent application Ser. No. 14/929,522, filed Nov. 2, 2015, which claims the benefit of U.S. Provisional Patent Application No. 62/073,135, filed Oct. 31, 2014, the entire contents of which are fully incorporated herein by reference.

FIELD OF DISCLOSURE

The present disclosure relates to systems and methods for providing personalized transaction learning and tagging using various machine learning techniques described herein.

BACKGROUND OF THE DISCLOSURE

Financial transactions may be categorized by the subject relating to the transaction, such as, for example, entertainment. However, these categories are static and lacking account-holder input relating to how the account-holder appreciates spending habits and categories. Moreover, current systems do not incorporate any machine learning into transaction categorization. At best, current systems may designate a transaction by simply looking at how a transaction from a particular merchant was designated previously. In this manner, current systems do not perform any artificial intelligence to financial transactions.

Because artificial intelligence is left out of transaction categorization, current systems are unable to understand and manage the personal financial life of an account holder according to how a particular account holder perceives his or her financial life.

These and other drawbacks exist.

SUMMARY OF THE DISCLOSURE

In one example embodiment, the present disclosure is directed to a method for providing for providing personalized transaction learning and tagging using various electronic learning and artificial intelligence algorithms.

The method may include tagging transactions associated with one or more financial accounts belonging to an account holder, whether the account holder be the primary, secondary, or a related account holder, such as a spouse, parent, guardian, and the like. The method may include linking all accounts belonging to and/or associated with an account holder and receiving transaction data from each linked account, including, for example, transaction date, transaction time, transaction amount, merchant name, merchant location, merchant identifier, account number used in transaction, SKU-level transaction information, and/or other purchase identifiers (e.g., merchant-provided product/service name, account holder-provided product/service name, and the like). Once the system receives the transaction data, the system may query the account holder for input regarding the transaction data. The input may include tagging the transaction as belonging to a particular spending category and/or affirming or denying that the transaction belongs to a particular category. The system may receive account holder data as well, such as demographic data, credit data, and/or account holder profile data.

Demographic data may include, for example, age, gender, income level, household data (e.g., number of people living at a household, age of people living at a household, and the like), type of housing (e.g., mobile home, single-family house, apartment, condominium, boat, recreational vehicle, automobile, and the like), education data (e.g., highest level of education obtained, whether an account holder is currently enrolled in school, and the like), ancestry and/or ethnic origin(s), language(s) spoken, employment data (e.g., employer, occupation, full-time/part-time employment, and the like), marital status, and/or children data (e.g., number of children, ages of children, whether children reside with the account holder, and the like). Credit data may include, for example, a credit score, a number of financial accounts associated with the account holder and what type of financial account (e.g., credit, debit, and the like), bill-payment history data, length of available credit being used, recent credit activity, and/or debt data (whether the account holder has been referred for collection, foreclosure or bankruptcy). Account holder profile data may include account holder name, address, telephone number, email address, account number(s), secondary account holders associated with each account (e.g., a child, a spouse, and the like), related account(s) (e.g., accounts belonging to a child, accounts belonging to a spouse, and the like), account transaction data, account status (e.g., amount of money and/or credit available in an account, payments due to the account, and the like), and/or spend categories that are used to tag transactions made by the account holder.

In order to tag transactions associated with one or more financial accounts belonging to an account holder, the method may include receiving transaction data to categorize. Transaction data may be received though an application programming interface ("API") associated with a financial institution maintaining the account belonging to or associated with the account holder. Transaction data also may be received by scanning a transaction receipt, using optical character recognition ("OCR") to recognize the characters on the receipt and/or receiving transaction data via a barcode, a quick response ("QR") code, or the like from the receipt. Transaction data also may be received through a mobile device and/or other computing device capable of participating in an account holder's transaction. For example, a computing device may conduct a transaction with an online retailer over an Internet connection and receive a digital receipt, which the computing device may read in and categorize. As another example, a mobile device may conduct a transaction using, for example, near-field communication ("NFC") technology and, upon approval of the transaction, the mobile device may receive a receipt of transaction data for tagging and categorization.

Once transaction data is received, a system for providing personalized transaction learning and tagging may analyze the transaction data and determine if a previously stored spend category for the account holder is associated with the transaction data (e.g., the merchant information, transaction date, location information, and/or SKU-level data matches previously stored spending categories associated with the account holder). If the transaction data is associated with a previously stored spend category for the account holder, the system may determine a most-likely match for the spend category and prompt the account holder for a confirmation, request additional transaction details, and/or request an appropriate spend category to tag the transaction data.

The system may determine a most-likely match for the spend category based on the transaction data, such as the transaction date, the merchant information, SKU-level data, the transaction location, other transaction data, and/or spend category parameters. For example, if an account holder has categorized recent transactions at office supply stores and retail stores as "Back to School" spending, the system may determine that a transaction taking place within a time-frame close to those transactions at a retail store in a location close to the recent transactions is likely to be categorized as "Back to School" as well. As another example, if an account holder has set spend category parameters to indicate that any transactions occurring at a retail store within a first date and a second data should be tagged as "Back to School," the system may tag all transactions from retail stores within the date parameters as "Back to School."

The system may determine a most-likely match for the spend category based further on account holder demographic data, credit data, and profile data associated with the account holder or a similar account holder. A most-likely spend category may be determined for an account holder with similarities between current and/or real-time transaction data and spend category parameters and/or historical transaction data that has been previously tagged. A proposed spend category, described below, may be determined for an account holder where the number of similarities between a current and/or real-time transaction data and spend category parameters and/or historical transaction data is below a predetermined threshold (e.g., a threshold may indicate at least one similarity should exist, or at least a number of similarities should exist).

A similar account holder may be determined by comparing transaction data, demographic data, credit data, and account holder profile data of one account holder with another to determine how many similarities exist between the two account holders. If the number of similarities is above a predetermined threshold, the two account holders may be marked as similar account holders. For example, where a first account holder has a "Back to School" spend category and a second similar account holder has a "School Time" spend category, the system may compare transaction data associated with the two categories. Accordingly, in this example, where the first account holder conducts a transaction at a store that sells computers and other electronics, the system may compare the transaction data to the "Back to School" transaction data, which may include recent transactions at office supply stores and retail stores as well as the "School Time" transaction data associated with the second similar account holder, which may include recent transaction at a computer and electronics store. The system may then tag the computer transaction of the first account holder as "Back to School" based on the similar transaction tagged as "School Time" for the second similar account holder.

Once a most-likely spend category is determined for a transaction, the system may prompt the account holder to confirm, deny, and/or manually input a spend category to tag the transaction. The system may then receive an account holder response. If the account holder confirmed the spend category tag, the system may tag the transaction data with the spend category information and save the transaction data and spend category tag for later analysis. If the account holder denies the spend category tag, the system may determine a second most-likely spend category for the transaction in a similar manner as described above and ask the account holder to confirm, deny, and/or manually input a spend category tag again. The system may continuously determine a most-likely spend category as long as the account holder requests the system to do so. The system may also present multiple most-likely spend categories for the account holder to select. The system may present the multiple most-likely spend categories initially or in response to a denial of a first most-likely spend category.

A manual input of a spend category may include a manual selection of a preexisting spend category or a manual input of a new spend category. If an account holder manually tags transaction data, the system may store the tag and category information, and search for like transactions that have not been tagged. If like transactions that have not been tagged are found, the system may present the transaction data associated with the like transactions to the account holder and request that the account holder confirm or deny that transaction data should be tagged with the new spend category.

As described above, if the transaction data does not match any previously tagged transaction data and/or spend category parameters or does not meet a threshold level of similarity, the system may search for similarly transaction data tagged by similar account holders and/or spend categories of similar account holders with spend category parameters matching a threshold number of transaction data. For example, if a first account holder transacts to purchase a can of paint at a home improvement store, and the first account holder has no transactions tagged with any transaction data in common to the instant paint transaction and the instant transaction does not meet any spend category parameters, the system may search for similar account holders (as described above) to see if any similar account holders have spend category parameters matching a threshold number of transaction data and/or a tagged transaction for a can of paint at the same home improvement store. In this example, the system may then propose the category associated with the tagged transaction and/or spend category of the similar account holder to the first account holder. The system may propose any number of categories to tag the first account holder's transaction. For example, a similar account holder may have purchased a can of paint or may have a number of transactions from the same merchant, where the similar account holder has tagged the purchase(s) as "2014 Home Improvement." The system may propose to the first account holder that the transaction should be tagged as a "2014 Home Improvement." If the first account holder accepts the proposed category, the system may create the new spend category and save the transaction tag and transaction data associated with the spend category. Also, a similar account holder may have a spend category with spend category parameters that indicate the transaction may fit within that spend category (e.g., a similar account holder has a spend category labeled "2014 Home Improvements" for all purchases made at home improvement stores in 2014). When a first account holder makes a purchase at a home improvement store in 2014 but does not have any transaction data and/or spend category parameters that indicate a most-likely spend category, the categorization system may propose the spend category from the similar account holder that matches the transaction data; here "2014 Home Improvements."

Similar to the description above, the first account holder may reject the proposed spend category, may request additional spend category proposals, and/or may manually input the spend category.

Once all transaction data has been tagged with an appropriate spend category, the system may employ artificial intelligence and/or machine learning algorithms to create additional spend categories with spend category parameters to tag future transaction data and/or past transaction data. In this manner, the system continuously learns and proposes spend categories that may be important to the specific account holder and what transaction data should be tagged with what spend category in a manner specific to the account holder.

Unlike existing transaction categorization, the present system allows the user to define what transaction details are relevant to tagging a transaction with a particular spend category. For example, when an account holder takes a vacation or a business trip, the transaction data that may be important in determining whether the transaction data is to be categorized as "Vacation" or "Work Trip to Dallas" may be the transaction date, the transaction location, and/or the merchant (e.g., a travel agent, an airline, a hotel chain, and the like). As another example, when an account holder purchases school supplies, the transaction data that may be important in determine whether the transaction data is to be categorized as "School Supplies" may include a transaction date, a merchant type, a merchant name, and/or a transaction location. These examples are merely illustrative, and transactions may be categorized according to any data described herein.

BRIEF DESCRIPTION OF THE DRAWINGS

Various embodiments of the present disclosure, together with further objects and advantages, may best be understood by reference to the following description taken in conjunction with the accompanying drawings, in the several figures of which like reference numerals identify like elements, and in which.

DETAILED DESCRIPTION

Figure 1:
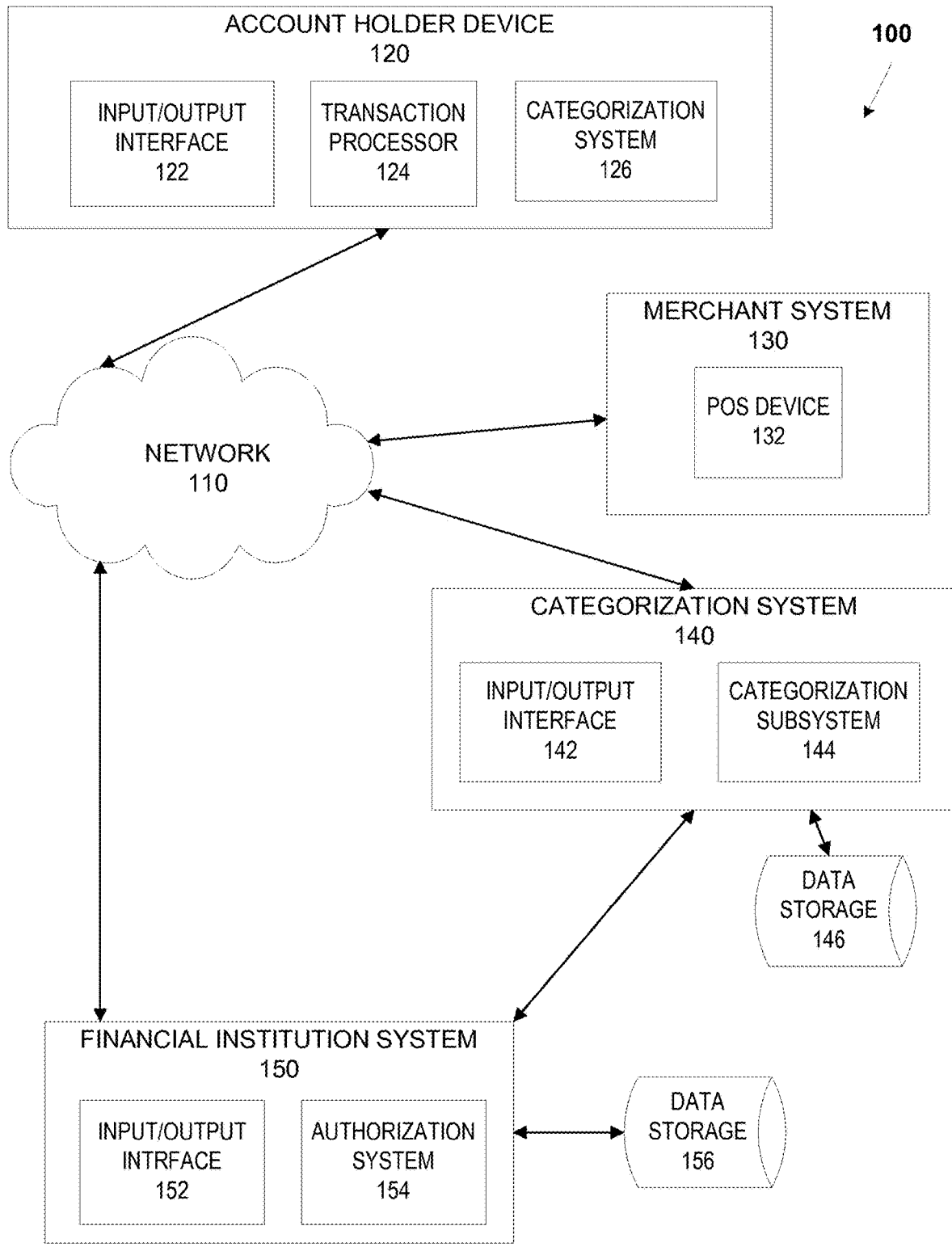
FIG. 1 is a diagram illustrating an example system for providing personalized transaction learning and tagging, consistent with various embodiments.

The following description is intended to convey a thorough understanding of the embodiments described by providing a number of specific example embodiments and details involving systems and methods for providing personalized transaction learning and tagging. It should be appreciated, however, that the present disclosure is not limited to these specific embodiments and details, which are examples only. It is further understood that one possessing ordinary skill in the art, in light of known systems and methods, would appreciate the use of the invention for its intended purposes and benefits in various embodiments, depending on specific design and other needs. A financial services institution and systems supporting a financial institution are used in the examples of the disclosure. However, the disclosure is not intended to be limited to financial services institutions only. Instead, the disclosed system and method can be extended to any entity that provides transaction data. Moreover, a third party categorization system is used in the examples of the disclosure. However, the disclosure is not intended to be limited to a third party system and may be incorporated within a financial institution system as well. These alterations may be made without departing from the spirit and scope of the disclosure.

According to the various embodiments of the present disclosure, systems and methods are disclosed for enabling automated, personalized transaction learning and tagging using various electronic devices associated with payment transactions/instruments at the time of purchase or any time thereafter. Transaction tagging may include storing a spend category label and associating the spend category label with specific transaction data. Transaction tagging may further include associating a meta tag with transaction data, such as a specific transaction, or a specific item included in a transaction. Transaction tagging may include storing a spend category label and spend category parameters that define the spend category label. For example, spend category parameters may include a budget, date parameters (e.g., a start date and an end date, etc.), merchant parameters (e.g., merchant type, merchant name, merchant ID, etc.), location parameters (e.g., a country, a state, a city, a zip code, etc.), account parameters (e.g., checking account, savings account, a Visa® credit card, a Capital One® debit card, etc.), SKU parameters (e.g., a specific item and/or service to be purchased), and notification data (e.g., when to send an alert and/or report, what type of alert and/or report to send, and the like). Notification data may be used to determine and activity after a new transaction is added to the spend category as described herein.

The transaction data may include a full transaction (e.g., a purchase of eight items at a merchant in a single transaction). The transaction data may also be broken down to a single item (e.g., SKU-level data). Once the transaction data is tagged, the spend category information may be updated to reflect the additional transaction data. For example, the spend category information may include a total amount spent, a remaining budget amount, a percentage of budget spent, and/or a percentage of budget remaining. The systems and methods depicted in, for example, FIGS. 1 through 13 allow an account holder to receive a personalized view of transactions according to the category each transaction is tagged with.

In an example embodiment, the systems and methods of the disclosure may be configured to operate in connection with an account holder device (e.g., a smartphone, an electronic reader, a laptop computer, etc. a set top box, a cable card, etc.) that allows a user to transact with a merchant system. In such an embodiment, the merchant system may include one or more software applications stored in memory to perform transactions and transmit data to an association/interchange system for transaction processing. The systems and methods may further include one or more corresponding categorization system(s) and one or more cloud-based services, which may be operated by data service providers, financial institution systems, third party application providers and the like, for example. In the disclosed embodiments, the illustrative data provider may be a financial services institution. The data provider also may be any type of entity that provides data to a user via a user device.

FIG. 1 is a diagram illustrating an example system for providing personalized transaction learning and tagging, according to the various embodiments. As shown in FIG. 1, an example system 100 may include one or more account holder devices 120, one or more merchant systems 130, one or more categorization systems 140, and one or more financial institution systems 150 connected over one or more networks 110.

For example, network 110 may be one or more of a wireless network, a wired network or any combination of wireless network and wired network. For example, network 110 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, DAMPS, Wi-Fi, Fixed Wireless Data, IEEE 802.11b, 802.15.1, 802.11n and 802.11g or any other wired or wireless network for transmitting and receiving a data signal.

In addition, network 110 may include, without limitation, telephone lines, fiber optics, IEEE Ethernet 902.3, a wide area network ("WAN"), a local area network ("LAN"), or a global network such as the Internet. Also network 110 may support an Internet network, a wireless communication network, a cellular network, or the like, or any combination thereof. Network 110 may further include one network, or any number of the example types of networks mentioned above, operating as a stand-alone network or in cooperation with each other. Network 110 may utilize one or more protocols of one or more network elements to which they are communicatively coupled. Network 110 may translate to or from other protocols to one or more protocols of network devices. Although network 110 is depicted as a single network, it should be appreciated that according to one or more embodiments, network 110 may comprise a plurality of interconnected networks, such as, for example, the Internet, a service provider's network, a cable television network, corporate networks, and home networks.

Account holder device 120 may be any type of computer, handheld device, and/or transaction card (not pictured). Merchant system 130 may include any type of computer and/or processing system for processing merchant-related transactions. Categorization system 140 may include a system in having a secure connection to at least one financial institution system, and preferably to multiple financial institution systems, in order to receive transaction data from one or more accounts associated with an account holder.

Financial institution systems 150 may include systems associated with, for example, a banking service company such as Capital One®, Bank of America®, Citibank®, Wells Fargo®, Sun Trust, various community banks, and the like, as well as a number of other financial institutions such as Visa®, MasterCard®, and AmericanExpress®. Financial institution system 150 may include and/or be connected to one or more computer systems and networks to process transactions. Financial institution system 150 may include systems associated with financial institutions that issue payment cards and maintains a contract with cardholders for repayment. In various embodiments, a financial institution 150 may issue credit, debit, and/or stored value cards, for example. Financial institution 150 may include, by way of example and not limitation, depository institutions (e.g., banks, credit unions, building societies, trust companies, mortgage loan companies, pre-paid gift cards or credit cards, etc.), contractual institutions (e.g., insurance companies, pension funds, mutual funds, etc.), investment institutions (e.g., investment banks, underwriters, brokerage funds, etc.), and other non-bank financial institutions (e.g., pawn shops or brokers, cashier's check issuers, insurance firms, check-cashing locations, payday lending, currency exchanges, microloan organizations, crowd-funding or crowd-sourcing entities, third-party payment processors, etc.).

For example, account holder devices 120, merchant systems 130, categorization systems 140, and/or financial institution systems 150 may include, for example, one or more mobile devices, such as, for example, personal digital assistants (PDA), tablet computers and/or electronic readers (e.g., iPad, Kindle Fire, Playbook, Touchpad, etc.), wearable devices (e.g., Google Glass), telephony devices, smartphones, cameras, music playing devices (e.g., iPod, etc.), televisions, set-top-box devices, and the like.

Account holder devices 120, merchant systems 130, categorization systems 140, and/or financial institution systems 150 also may include a network-enabled computer system and/or device. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The network-enabled computer systems may execute one or more software applications to, for example, receive data as input from an entity accessing the network-enabled computer system, process received data, transmit data over a network, and receive data over a network.

Account holder devices 120, merchant systems 130, categorization systems 140, and/or financial institution systems 150 may include at least one central processing unit (CPU), which may be configured to execute computer program instructions to perform various processes and methods. Account holder devices 120, merchant systems 130, categorization systems 140, and/or financial institution systems 150 may include data storage, including for example, random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, or any other storage mechanism.

Account holder device 120, merchant system 130, categorization system 140, and/or financial institution system 150 may further include, for example, a processor, which may be several processors, a single processor, or a single device having multiple processors. Although depicted as single elements, it should be appreciated that according to one or more embodiments, account holder device 120, merchant system 130, categorization system 140, and/or financial institution system 150 may comprise a plurality of account holder devices 120, merchant systems 130, categorization systems 140, and/or financial institution systems 150.

Account holder device 120, merchant system 130, categorization system 140, and/or financial institution may further include data storage (e.g., data storage 146, 156). The data storage may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, or any other storage mechanism.

As shown in FIG. 1, each account holder device 120, categorization system 140, and/or financial institution 150 may include various components. As used herein, the term "component" may be understood to refer to computer executable software, firmware, hardware, and/or various combinations thereof. It is noted there where a component is a software and/or firmware component, the component is configured to affect the hardware elements of an associated system. It is further noted that the components shown and described herein are intended as examples. The components may be combined, integrated, separated, or duplicated to support various applications. Also, a function described herein as being performed at a particular component may be performed at one or more other components and by one or more other devices instead of or in addition to the function performed at the particular component. Further, the components may be implemented across multiple devices or other components local or remote to one another. Additionally, the components may be moved from one device and added to another device, or may be included in both devices.

Account holder device 120 may include, for example, an input/output interface 122, a transaction system 124, and/or a categorization system 126. Where, for example, the account holder device 120 is a transaction card, the transaction card may be operable to communicate with a merchant system 130, including a Point of Sale (PoS) device, as described with respect to FIG. 4 below. Input/output interface 122 may enable communication between the components of system 100. Input/output interface 122 may include hardware, software, and/or firmware that may enable communication between account holder device 120 and merchant system 130. For example, input/output interface 122 may include an input/output interface and input/output devices driven by a processor. An input/output device and/or interface may include, for example, a transceiver, modems, network interfaces, buses, CD-ROM, keyboard, mouse, microphone, camera, touch screen, printers, USB flash drives, speakers, and/or any other device configured to receive and transmit electronic data.

Input/output interface 122 may include for example, I/O devices, which may be configured to provide input and/or output to client device 120 (e.g., keyboard, mouse, display, speakers, printers, modems, network cards, etc.). Input/output module also may include antennas, network interfaces that may provide or enable wireless and/or wire line digital and/or analog interface to one or more networks, such as network 110, over one or more network connections, a power source that provides an appropriate alternating current (AC) or direct current (DC) to power one or more components of account holder device 120, and a bus that allows communication among the various components of account holder device 120. Input/output interface 122 may include a display, which may include for example output devices, such as a printer, display screen (e.g., monitor, television, and the like), speakers, projector, and the like. Although not shown, each account holder device 120 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like.

Transaction processor 124 may include hardware and/or software to enable transaction processing using a payment method as described with reference to FIGS. 2 through 5. For example, transaction processor 124 may include at least one processor configured to securely transmit payment information require to perform a transaction with a merchant. Transaction processor 124 may include at least one processor configured to transmit and/or receive transaction data and/or a transaction result from a merchant system 130 where a transaction result may include, transaction approved or transaction denied. Transaction data may include for example, transaction date, transaction time, transaction amount, merchant name, merchant location, merchant identifier, account number used in transaction, SKU-level transaction information, and/or other purchase identifiers (e.g., merchant-provided product/service name, account holder-provided product/service name, and the like).

Categorization system 126 may receive data via input/output module 122 from categorization subsystem 144 at categorization system 140. Categorization system 126 may execute various functionality to aid an account holder using an account holder device in selecting spend category parameters, tagging historical transaction data, and/or preparing and displaying an alert and/or report based on the spend category data and transaction data received at the account holder device.

Merchant system 130 may include, among other components, a PoS device 132. PoS device 132 may include a variety of readers to read transaction data associated with a transaction taking place with a merchant. PoS device 132 may include various hardware and/or software components required to conduct and process transaction, such as components described throughout FIGS. 2, 3, and 4. Merchant system 130 may also include data storage (not shown) to store transaction data and/or approval of charges between an account holder and the merchant associated Categorization system 140 may include various software and/or hardware components operable to perform the categorization methods according to FIG. 5. For example, categorization system may include software and/or hardware components operable to enable input/output interface 142 and categorization subsystem 144. Input/output interface 142 may enable communication between components of system 100. Input/output interface 142 may enable secure communications with one or more financial institution systems 150, which may include using various application programming interfaces (APIs) associated with the financial institution systems 150 in order to receive transaction data associated with an account holder.

An input/output device and/or interface may include, for example, a transceiver, modems, network interfaces, buses, CD-ROM, keyboard, mouse, microphone, camera, touch screen, printers, USB flash drives, speakers, and/or any other device configured to receive and transmit electronic data. Input/output interface 142 may include for example, I/O devices, which may be configured to provide input and/or output to and/or from categorization system 140 (e.g., keyboard, mouse, display, speakers, printers, modems, network cards, etc.). Input/output interface 142 also may include antennas, network interfaces that may provide or enable wireless and/or wire line digital and/or analog interface to one or more networks, such as network 110, over one or more network connections, a power source that provides an appropriate alternating current (AC) or direct current (DC) to power one or more components of categorization system 140, and a bus that allows communication among the various components of categorization system 140. Input/output interface 142 may include a display, which may include for example output devices, such as a printer, display screen (e.g., monitor, television, and the like), speakers, projector, and the like. Although not shown, categorization system 140 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like. Categorization module 144 may include various software and/or hardware component to enable the personalized tagging of account holder transaction data according to FIG. 5.

Financial institution system 150 may include various software and/or hardware components operable to enable an input/output interface 152 and/or an authorization interface 154. Input/output interface 152 may include may enable communication between the components of system 100. Input/output interface 152 may include hardware, software, and/or firmware that may enable communication between, for example, categorization system 140 or merchant system 130. For example, input/output interface 152 may include an input/output interface and input/output devices driven by a processor. An input/output device and/or interface may include, for example, a transceiver, modems, network interfaces, buses, CD-ROM, keyboard, mouse, microphone, camera, touch screen, printers, USB flash drives, speakers, and/or any other device configured to receive and transmit electronic data. Input/output interface 152 may include for example, I/O devices, which may be configured to provide input and/or to and/or from financial institution system 150 (e.g., keyboard, mouse, display, speakers, printers, modems, network cards, etc.). Input/output interface 152 also may include antennas, network interfaces that may provide or enable wireless and/or wire line digital and/or analog interface to one or more networks, such as network 110, over one or more network connections, a power source that provides an appropriate alternating current (AC) or direct current (DC) to power one or more components of financial institution system 150, and a bus that allows communication among the various components of financial institution system 150. Input/output interface 152 may include a display, which may include for example output devices, such as a printer, display screen (e.g., monitor, television, and the like), speakers, projector, and the like. Although not shown, financial institution system 150 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like.

Authorization system 154 may include at least one processor and data storage 156 required to authorize and approve a transaction and/or communicate with various external systems in order to authorize and approve a transaction. For example, transaction approval may occur as describe herein with respect to FIGS. 2 through 4.

In one or more implementations of the components of FIG. 1, the functions described may be implemented in hardware, software, firmware, or any combination thereof. If implemented in software, the functions may be stored as one or more instructions or code on computer-readable medium, including the computer-readable medium described above (e.g., RAM, ROM, storage media, and the like.).

Although FIG. 1 depicts account holder device 120, merchant system 130, categorization system 140, and/or financial institution system 150 communicating with one another using an indirect network connection, such as a connection through network 110, those skilled in the art may appreciate that account holder device 120, merchant system 130, categorization system 140, and/or financial institution system 150 may communicate with one another and similar devices using a direct communications link or a communications link separate from network 110. For example, account holder device 120, merchant system 130, categorization system 140, and/or financial institution system 150 may communicate with one another via point-to-point connections (e.g., Bluetooth connections, etc.), peer-to-peer connections, and the like. By way of example, account holder device 120, merchant system 130, categorization system 140, and/or financial institution system 150 may communicate with one another via mobile contactless communication and/data transfers, remote electronic communication and/data transfers, magnetic stripe communication and/data transfers, secure chip technology communication and/data transfers, person-to-person communication and/data transfers, and the like. Additionally, account holder device 120, merchant system 130, categorization system 140, and/or financial institution system 150 may communicate with one another utilizing standardized transmission protocols, for example and not by way of limitation, ISO/IEC 14443 A/B, ISO/IEC 18092, MiFare, FeliCa, tag/smartcard emulation, and the like. Also account holder device 120, merchant system 130, categorization system 140, and/or financial institution system 150 may communicate with one another utilizing transmission protocols and methods that are developed in the future using other frequencies or modes of transmission. Account holder device 120, merchant system 130, categorization system 140, and/ or financial institution system 150 may communicate with one another via existing communication and/or data transfer techniques, such as, for example RFID. Also, account holder device 120, merchant system 130, categorization system 140, and/or financial institution system 150 may communicate with one another via new and evolving communication and/data transfer standards including internet-based transmission triggered by near-field communications (NFC).

In the embodiment of FIG. 1, account holder device 120, merchant system 130, categorization system 140, and/or financial institution system 150 may communicate using standard Internet Protocols, such as HTTP and/or HTTPS, transmission control protocol (TCP), internet protocol (IP), etc. For example, HTTPS requests from account holder device 120, merchant system 130, categorization system 140, and/or financial institution system 150 may be encapsulated in TCP segments, IP datagrams, and Ethernet frames and transmitted to account holder device 120, merchant system 130, categorization system 140, and/or financial institution system 150. Third parties, for example, may participate as intermediaries in the communication, such as, for example, Internet Service Providers (ISPs) or other entities that provide routers and link layer switches. Such third parties may not, however, analyze or review the contents of the Ethernet frames beyond the link layer and the network layer, but instead analyze only those parts of the packet necessary to route communications among and between from account holder device 120, merchant system 130, categorization system 140, and/or financial institution system 150.

Figure 2:
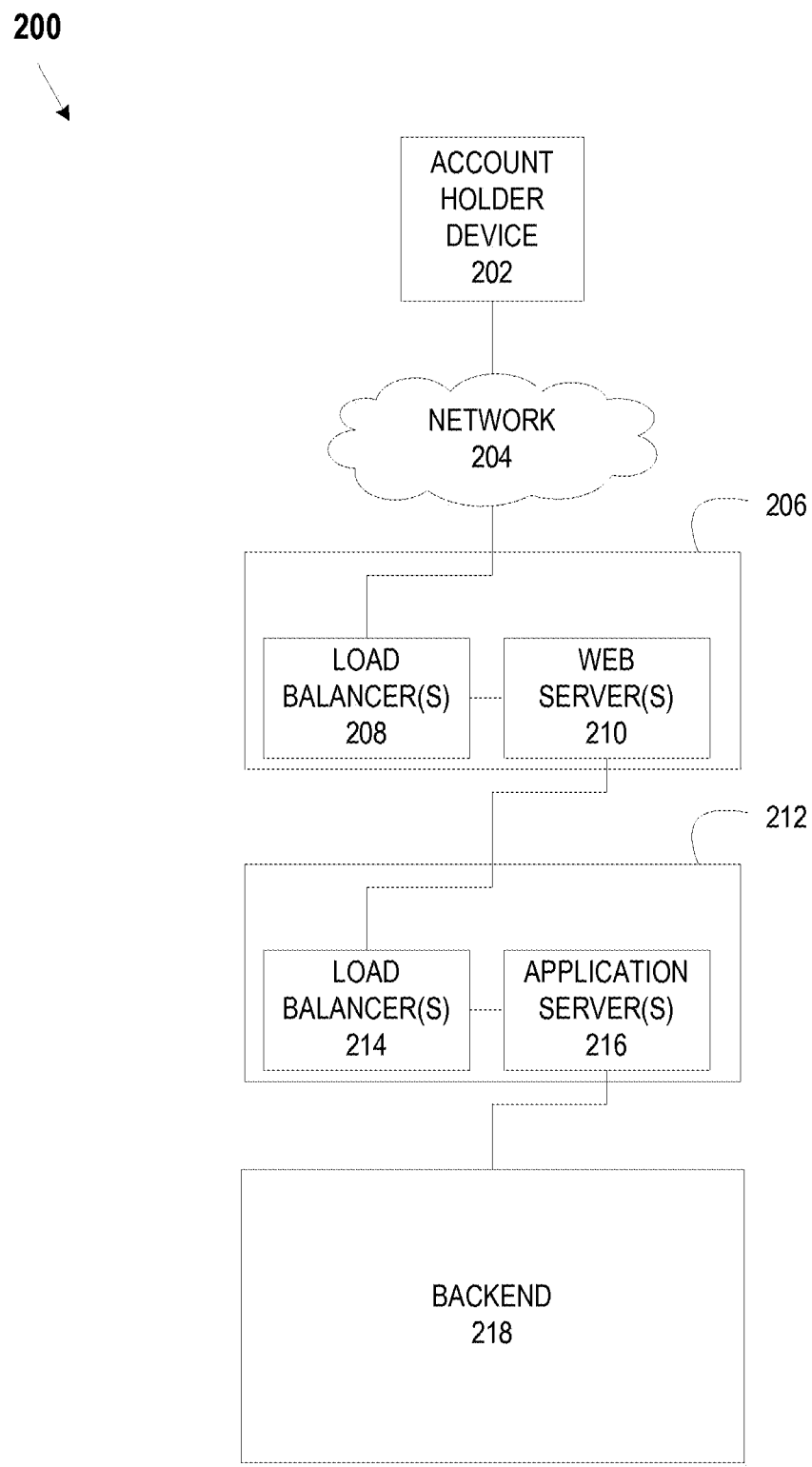
FIG. 2 is a diagram illustrating an example system for providing personalized transaction learning and tagging, consistent with various embodiments.

FIG. 2 depicts an example system used in providing personalized transaction learning and tagging. The example system 200 in FIG. 2 may enable a financial institution, for example, to provide network services to its account holders. As shown in FIG. 2, system 200 may include an account holder device 202, a network 204, a front-end controlled domain 206, a back-end controlled domain 212, and a backend 218. Front-end controlled domain 206 may include one or more load balancers 208 and one or more web servers 210. Back-end controlled domain 212 may include one or more load balancers 214 and one or more application servers 216.

Account holder device 202 may be a network-enabled computer. As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of the example system 200 may execute one or more software applications to enable, for example, network communications.

Account holder device 202 also may be a mobile device. For example, a mobile device may include an iPhone, iPod, iPad from Apple® or any other mobile device running Apple's iOS operating system, any device running Google's Android® operating system, including for example, Google's wearable device, Google Glass, any device running Microsoft's Windows® Mobile operating system, and/or any other smartphone or like wearable mobile device. Account holder device 202 also may be similar to account holder device 120 as shown and described in FIG. 1.

Network 204 may be one or more of a wireless network, a wired network, or any combination of a wireless network and a wired network. For example, network 204 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal.

In addition, network 204 may include, without limitation, telephone lines, fiber optics, IEEE Ethernet 902.3, a wide area network (WAN), a local area network (LAN) or a global network such as the Internet. Also, network 204 may support an Internet network, a wireless communication network, a cellular network, or the like, or any combination thereof. Network 204 may further include one network, or any number of example types of networks mentioned above, operating as a stand-alone network or in cooperation with each other. Network 204 may utilize one or more protocols of one or more network elements to which they are communicatively couples. Network 204 may translate to or from other protocols to one or more protocols of network devices. Although network 204 is depicted as a single network, it should be appreciated that according to one or more embodiments, network 204 may comprise a plurality of interconnected networks, such as, for example, the Internet, a service provider's network, a cable television network, corporate networks, and home networks.

Front-end controlled domain 206 may be implemented to provide security for backend 218. Load balancer(s) 208 may distribute workloads across multiple computing resources, such as, for example computers, a computer cluster, network links, central processing units or disk drives. In various embodiments, load balancer(s) 210 may distribute workloads across, for example, web server(S) 216 and/or backend 218 systems. Load balancing aims to optimize resource use, maximize throughput, minimize response time, and avoid overload of any one of the resources. Using multiple components with load balancing instead of a single component may increase reliability through redundancy. Load balancing is usually provided by dedicated software or hardware, such as a multilayer switch or a Domain Name System (DNS) server process.

Load balancer(s) 208 may include software that monitoring the port where external clients, such as, for example, account holder device 202, connect to access various services of a financial institution, for example. Load balancer(s) 208 may forward requests to one of the application servers 216 and/or backend 218 servers, which may then reply to load balancer 208. This may allow load balancer(s) 208 to reply to account holder device 202 without account holder device 202 ever knowing about the internal separation of functions. It also may prevent account holder devices from contacting backend servers directly, which may have security benefits by hiding the structure of the internal network and preventing attacks on backend 218 or unrelated services running on other ports, for example.

A variety of scheduling algorithms may be used by load balancer(s) 208 to determine which backend server to send a request to. Simple algorithms may include, for example, random choice or round robin. Load balancers 208 also may account for additional factors, such as a server's reported load, recent response times, up/down status (determined by a monitoring poll of some kind), number of active connections, geographic location, capabilities, or how much traffic it has recently been assigned.

Load balancers 208 may be implemented in hardware and/or software. Load balancer(s) 208 may implement numerous features, including, without limitation: asymmetric loading; Priority activation: SSL Offload and Acceleration; Distributed Denial of Service (DDoS) attack protection; HTTP/HTTPS compression; TCP offloading; TCP buffering; direct server return; health checking; HTTP/HTTPS caching; content filtering; HTTP/HTTPS security; priority queuing; rate shaping; content-aware switching; client authentication; programmatic traffic manipulation; firewall; intrusion prevention systems.

Web server(s) 210 may include hardware (e.g., one or more computers) and/or software (e.g., one or more applications) that deliver web content that can be accessed by, for example a client device (e.g., account holder device 202) through a network (e.g., network 204), such as the Internet. In various examples, web servers, may deliver web pages, relating to, for example, online banking applications and the like, to clients (e.g., account holder device 202). Web server(s) 210 may use, for example, a hypertext transfer protocol (HTTP/HTTPS or sHTTP) to communicate with account holder device 202. The web pages delivered to client device may include, for example, HTML documents, which may include images, style sheets and scripts in addition to text content.

A user agent, such as, for example, a web browser, web crawler, or native mobile application, may initiate communication by making a request for a specific resource using HTTP/HTTPS and web server 210 may respond with the content of that resource or an error message if unable to do so. The resource may be, for example a file on stored on backend 218. Web server(s) 210 also may enable or facilitate receiving content from account holder device 202 so account holder device 202 may be able to, for example, submit web forms, including uploading of files.

Web server(s) also may support server-side scripting using, for example, Active Server Pages (ASP), PHP, or other scripting languages. Accordingly, the behavior of web server(s) 210 can be scripted in separate files, while the actual server software remains unchanged.

Load balancers 214 may be similar to load balancers 208 as described above.

Application server(s) 216 may include hardware and/or software that is dedicated to the efficient execution of procedures (e.g., programs, routines, scripts) for supporting its applied applications. Application server(s) 216 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Also, application server(s) 216 may act as a set of components accessible to, for example, a financial institution, categorization company, or other entity implementing system 200, through an API defined by the platform itself. For Web applications, these components may be performed in, for example, the same running environment as web server(s) 210, and application servers 216 may support the construction of dynamic pages. Application server(s) 216 also may implement services, such as, for example, clustering, fail-over, and load-balancing. In various embodiments, where application server(s) 216 are Java application servers, the web server(s) 216 may behaves like an extended virtual machine for running applications, transparently handling connections to databases associated with backend 218 on one side, and, connections to the Web client (e.g., client device 202) on the other.

Backend 218 may include hardware and/or software that enables the backend services of, for example, a financial institution, categorization company, or other entity that maintains a distributed system similar to system 200. For example, backend 218 may include, a system of record, online banking applications, a rewards platform, a payments platform, a lending platform, including the various services associated with, for example, auto and home lending platforms, a statement processing platform, one or more platforms that provide mobile services, one or more platforms that provide online services, a card provisioning platform, a general ledger system, a transaction categorization system, which may include additional capabilities, such as budget management, and the like. Backend 218 may be associated with various databases, including account databases that maintain, for example, account holder information (e.g., demographic data, credit data, account holder profile data, and the like), transaction databases that maintain transaction data, product databases that maintain information about products and services available to customers, content databases that store content associated with, for example, a financial institution, and the like. Backend 218 also may be associated with one or more servers that enable the various services provided by system 200. Backend 218 may enable a financial institution and/or a categorization company, for example, to implement the personalized transaction learning and tagging methods as shown and described herein.

Figure 3:
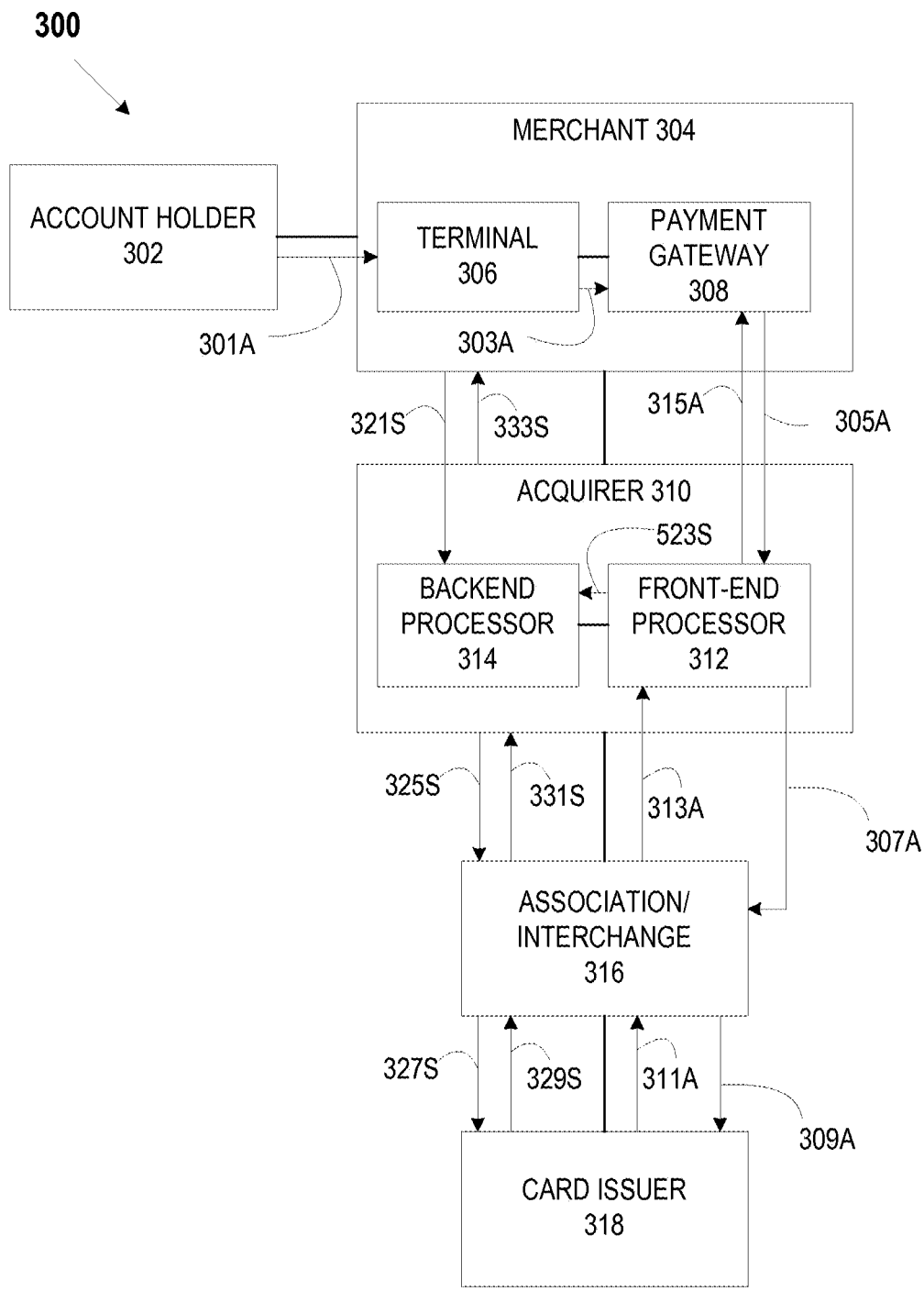
FIG. 3 is a diagram illustrating an example system for providing personalized transaction learning and tagging, consistent with various embodiments.

FIG. 3 illustrates an example system 300 and method for transaction authorization. As shown and described in FIG. 3, merchants, account holders and financial institutions may be connected with a card association network to enable secure transactions and timely payments. System 300 may include a cardholder 302, merchant 304, Acquirer 310, Association/Interchange 316, and card issuer 318.

Cardholder 302 may be any card holder, including a credit card holder, debit card holder, stored value card holder and the like. Cardholder 302 may be similar to the account holder associated with account holder device 120. Cardholder 302 may possess a plastic card or carry a device (e.g., a mobile device) that securely stores card credentials and is capable of transmitting the card credentials to, for example, a PoS terminal (e.g., terminal 306). Cardholder 302 may interact with a merchant (e.g., merchant 304) by presenting a card or card credentials to a terminal (e.g., terminal 306).

Merchant 304 may be any merchant that accepts payment from a cardholder, for example. Merchant 304 may be any retailer, service provider, business entity, or individual that accepts payments. Merchant 304 may include software, firmware, and hardware for accepting and/or processing payments. For example, as illustrated in FIG. 3, merchant 304 may include a terminal 306 and a payment gateway 308. Terminal 306 and payment gateway 308 may comprise the physical or virtual device(s) used by merchant 304 to communicate information to front-end processor 312 of acquirer 310. Terminal 306 may be similar to a PoS system. In various embodiments, payment gateway 308 may be an e-commerce application service provider service that authorizes payments for merchants. As such, payment gateway 308 may be a virtual equivalent of a PoS terminal and interface with, for example, a billing system of merchant 304 and pass data to front-end processor 312 of acquirer 310.

Acquirer 310 may be, for example, a financial institution or bank that holds the contract for providing payment processing services to merchant 304. Merchant 304 may have a merchant account that may serve as a contract under which Acquirer 310 may extend a line of credit to a merchant who wishes to accept, for example, credit card transactions. As shown in FIG. 3, Acquirer 310 may be associated with front-end processor 312 and back-end processor 314.

In various examples, front-end processor 312 may be a platform that card terminal 306 and/or payment gateway 308 communicate with when approving a transaction. Front-end processor 312 may include hardware, firmware, and software to process transactions. Front-end processor 312 may be responsible for the authorization and capture portion of credit card transaction. Front-end processor 312 also may include additional front-end platform interconnections to support, for example, ACH and debit transactions.

Backend processor 314 may be a platform that takes captured transactions from front-end processor 312 and settles them through an Interchange system (e.g., association/interchange 316). Back-end processor 314 may generate, for example, daily ACH files for merchant settlement. Back-end processor 314 also may handle chargeback handling, retrieval request and monthly statements.

Association/interchange 316 may be the consumer payment system whose members are the financial institutions that issue payment cards and/or sign merchant to accept payment cards. Example associations/interchanges 316 may include, Visa®, MasterCard®, and American Express®. Association/interchange 316 may include one or more computer systems and networks to process transactions.

Issuer 318 may be a financial institution that issues payment cards and maintains a contract with cardholders for repayment. In various embodiments, issuer 318 may issue credit, debit, and/or stored value cards, for example. Example issuers may include, Capital One®, Bank of America®, Citibank®, Sun Trust®, and the like.

In various embodiments, processing a payment card transaction may involve two stages: (1) authorization and (2) clearing and settlement. Authorization may refer to an electronic request that is sent through various parties to either approve or decline the transaction. Clearing and Settlement may refer to settlement of the parties' settle accounts to enable the parties to get paid.

During authorization, cardholder 302 may present payment card as payment (301A) at merchant 304 PoS terminal 306, for example. Merchant 304 may enter card into a physical PoS terminal 306 or submit a credit card transaction to a payment gateway 308 on behalf of cardholder 302 via a secure connection from a Web site, retail location, or a wireless device.

Payment gateway 308 may receive the secure transaction information (303A) and may pass the secure transaction information (305A) via a secure connection to the merchant acquirer's 310 front-end processor 312.

Front-end processor 312 may submit the transaction (307A) to association/interchange 316 (e.g., a network of financial entities that communicate to manage the processing, clearing and settlement of credit card transactions). Association/interchange 316 may route the transaction (309A) to the customer's Issuer 318. Issuer 318 may approve or decline the transaction and passes the transaction results back (311A) through association/interchange 316. Association/interchange then may relay the transaction results (313A) to front-end processor 512.

Front-end processor 312 may relay the transaction results (315A) back to the payment gateway 308 and/or terminal 306. Payment gateway 308 may store the transaction results and sends them to merchant 304. Merchant 304 may receive the authorization response and complete the transaction accordingly.

During settlement, merchant 304 may deposit the transaction receipt (321S) with acquirer 310 via, for example, a settlement batch. Captured authorizations may be passed (323S) from front-end processor 312 to the back-end processor 314 for settlement. Back-end processor may generate ACH files for merchant settlement. Acquirer may submit settlement files (325S, 327S) to Issuer 318 for reimbursement via association/interchange 316. Issuer 318 may post the transaction and pay merchant 304 (329S, 331S, 333S).

Figure 4:
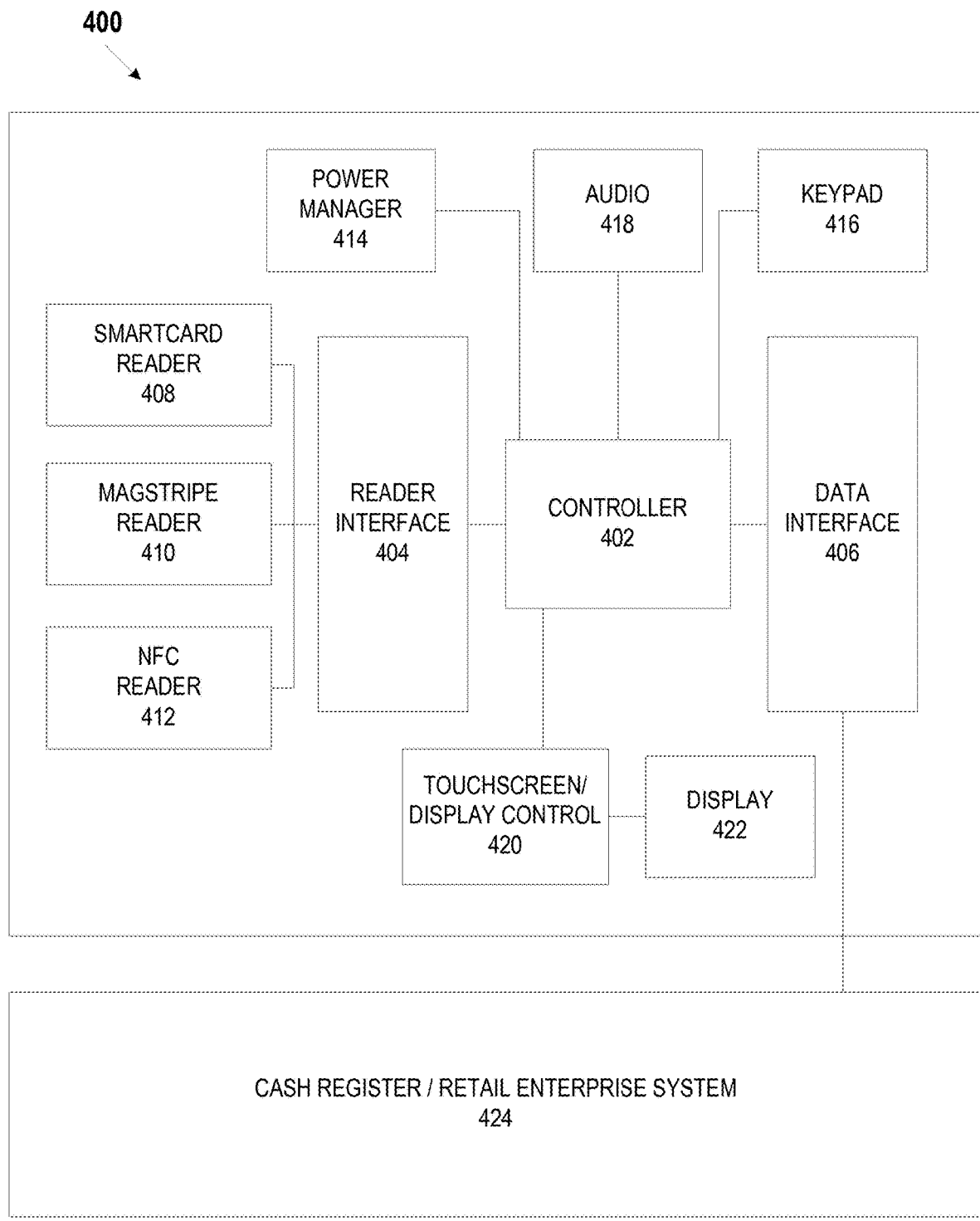
FIG. 4 is a diagram illustrating an example system for v providing personalized transaction learning and tagging, consistent with various embodiments.

With respect to a merchant and a PoS device, FIG. 4 illustrates an example PoS device 400. PoS device 400 may include a controller 402, a reader interface 404, a data interface 406, a smartcard reader 408, a magnetic stripe reader 410, a near-field communications (NFC) reader 412, a power manager 414, a keypad 416, an audio interface 418, a touchscreen/display controller 420, and a display 422. Also, PoS device 400 may be coupled with, integrated into or otherwise connected with a cash register/retail enterprise system 424.

In various embodiments, Controller 402 may be any controller or processor capable of controlling the operations of PoS device 400. For example, controller 402 may be an Intel® 2nd Generation Core™ i3 or i5 or Pentium™ G850 processor or the like. Controller 402 also may be a controller included in a personal computer, smartphone device, tablet PC or the like.

Reader interface 404 may provide an interface between the various reader devices associated with PoS device 400 and PoS device 400. For example, reader interface 404 may provide an interface between smartcard reader 408, magnetic stripe reader 410, NFC reader 412 and controller 402. In various embodiments, reader interface 404 may be a wired interface such as a USB, RS232 or RS485 interface and the like. Reader interface 404 also may be a wireless interface and implement technologies such as Bluetooth, the 802.11(x) wireless specifications and the like. Reader interface 404 may enable communication of information read by the various reader devices from the various reader devices to PoS device 400 to enable transactions. For example, reader interface 404 may enable communication of a credit or debit card number read by a reader device from that device to PoS device 400. In various embodiments, reader interface 404 may interface between PoS device 400 and other devices that do not necessarily "read" information but instead receive information from other devices.

Data interface 406 may allow PoS device 400 to pass communicate data throughout PoS device and with other devices including, for example, cash register/retail enterprise system 424. Data interface 406 may enable PoS device 400 to integrate with various customer resource management (CRM) and/or enterprise resource management (ERP) systems. Data interface 406 may include hardware, firmware and software that make aspects of data interface 406 a wired interface. Data interface 406 also may include hardware, firmware and software that make aspects of data interface 606 a wireless interface. In various embodiments, data interface 406 also enables communication between PoS device other devices.

Smartcard reader 408 may be any electronic data input device that reads data from a smart card. Smartcard reader 408 may be capable of supplying an integrated circuit on the smart card with electricity and communicating with the smart card via protocols, thereby enabling read and write functions. In various embodiments, smartcard reader 408 may enable reading from contact or contactless smart cards. Smartcard reader 408 also may communicate using standard protocols including ISO/IEC 7816, ISO/IEC 14443 and/or the like or proprietary protocols.

Magnetic stripe reader 410 may be any electronic data input device that reads data from a magnetic stripe on a credit or debit card, for example. In various embodiments, magnetic stripe reader 410 may include a magnetic reading head capable of reading information from a magnetic stripe. Magnetic stripe reader 410 may be capable of reading, for example, cardholder information from tracks 1, 2, and 3 on magnetic cards. In various embodiments, track 1 may be written on a card with code known as DEC SIXBIT plus odd parity and the information on track 1 may be contained in several formats (e.g., format A, which may be reserved for proprietary use of the card issuer; format B; format C-M which may be reserved for us by ANSI subcommittee X3B10; and format N-Z, which may be available for use by individual card issuers). In various embodiments, track 2 may be written with a 5-bit scheme (4 data bits plus 1 parity). Track 3 may be unused on the magnetic stripe. In various embodiments, track 3 transmission channels may be used for transmitting dynamic data packet information to further enable enhanced token-based payments.

NFC reader 412 may be any electronic data input device that reads data from an NFC device. In an exemplary embodiment, NFC reader 412 may enable Industry Standard NFC Payment Transmission. For example, the NFC reader 412 may communicate with an NFC enabled device to enable two loop antennas to form an air-core transformer when placed near one another by using magnetic induction. NFC reader 412 may operate at 13.56 MHz or any other acceptable frequency. Also, NFC reader 412 may enable a passive communication mode, where an initiator device provides a carrier field, permitting answers by the target device via modulation of existing fields. Additionally, NFC reader 412 also may enable an active communication mode by allowing alternate field generation by the initiator and target devices.

In various embodiments, NFC reader 412 may deactivate an RF field while awaiting data. NFC reader 412 may receive communications containing Miller-type coding with varying modulations, including 100% modulation. NFC reader 412 also may receive communications containing Manchester coding with varying modulations, including a modulation ratio of approximately 10%, for example. Additionally, NFC reader 412 may be capable of receiving and transmitting data at the same time, as well as checking for potential collisions when the transmitted signal and received signal frequencies differ.

NFC reader 412 may be capable of utilizing standardized transmission protocols, for example but not by way of limitation, ISO/IEC 14443 A/B, ISO/IEC 18092, MiFare, FeliCa, tag/smartcard emulation, and the like. Also, NFC reader 412 may be able to utilize transmission protocols and methods that are developed in the future using other frequencies or modes of transmission. NFC reader 412 also may be backwards-compatible with existing payment techniques, such as, for example RFID. Also, NFC reader 412 may support transmission requirements to meet new and evolving payment standards including internet based transmission triggered by NFC. In various embodiments, NFC reader 412 may utilize MasterCard's® PayPass and/or Visa's® PayWave and/or American Express'® ExpressPay systems to enable transactions.

Although not shown and described, other input devices and/or readers, such as for example, barcode readers and the like are contemplated.

Power manager 414 may be any microcontroller or integrated circuit that governs power functions of PoS device 400. Power manager 414 may include, for example, firmware, software, memory, a CPU, a CPU, input/output functions, timers to measure intervals of time, as well as analog to digital converters to measure the voltages of the main battery or power source of PoS device 400. In various embodiments, Power manager 414 remains active even when PoS device 400 is completely shut down, unused, and/or powered by the backup battery. Power manager 414 may be responsible for coordinating many functions, including, for example, monitoring power connections and battery charges, charging batteries when necessary, controlling power to other integrated circuits within PoS device 400 and/or other peripherals and/or readers, shutting down unnecessary system components when they are left idle, controlling sleep and power functions (on and off), managing the interface for built-in keypad and trackpads, and/or regulating a real-time clock (RTC).

Keypad 416 may any input device that includes a set of buttons arranged, for example, in a block or pad and may bear digits, symbols and/or alphabetical letters. Keypad 416 may be a hardware-based or mechanical-type keypad and/or implemented in software and displayed on, for example, a screen or touch screen to form a keypad. Keypad 416 may receive input from a user that pushed or otherwise activates one or more buttons on keypad 416 to provide input.

Audio interface 418 may be any device capable of providing audio signals from PoS device 400. For example, audio interface may be a speaker or speakers that may produce audio signals. In various embodiments, audio interface 418 may be integrated within PoS device 400. Audio interface 418 also may include components that are external to PoS device 400.

Touchscreen/display control 420 may be any device or controller that controls an electronic visual display. Touchscreen/display control 420 may allow a user to interact with PoS device 400 through simple or multi-touch gestures by touching a screen or display (e.g., display 422). Touchscreen/display control 420 may be configured to control any number of touchscreens, including, for example, resistive touchscreens, surface acoustic wave touchscreens, capacitive touchscreens, surface capacitance touchscreens, projected capacitance touchscreens, mutual capacitance touchscreens, self-capacitance touchscreens, infrared grid touchscreens, infrared acrylic projection touchscreens, optical touchscreens, touchscreens based on dispersive signal technology, acoustic pulse recognition touchscreens, and the like. In various embodiments, touchscreen/display control 420 may receive inputs from the touchscreen and process the received inputs. Touchscreen/display control 420 also may control the display on PoS device 400, thereby providing the graphical user interface on a display to a user of PoS device 400.

Display 422 may be any display suitable for a PoS device. For example, display 422 may be a TFT, LCD, LED or other display. Display 422 also may be a touchscreen display that for example allows a user to interact with PoS device 400 through simple or multi-touch gestures by touching a screen or display (e.g., display 422). Display 422 may include any number of touchscreens, including, for example, resistive touchscreens, surface acoustic wave touchscreens, capacitive touchscreens, surface capacitance touchscreens, projected capacitance touchscreens, mutual capacitance touchscreens, self-capacitance touchscreens, infrared grid touchscreens, infrared acrylic projection touchscreens, optical touchscreens, touchscreens based on dispersive signal technology, acoustic pulse recognition touchscreens, and the like. In various embodiments, 422 may receive inputs from control gestures provided by a user. Display 422 also may display images, thereby providing the graphical user interface to a user of PoS device 400.

Cash register/retail enterprise system 424 may me any device or devices that cooperate with PoS device 400 to process transactions. Cash register/retail enterprise system 424 may be coupled with other components of PoS device 400 via, for example, a data interface (e.g., data interface 406) as illustrated in FIG. 4. Cash register/retail enterprise system 424 also may be integrated into PoS device 400.

Figure 5:
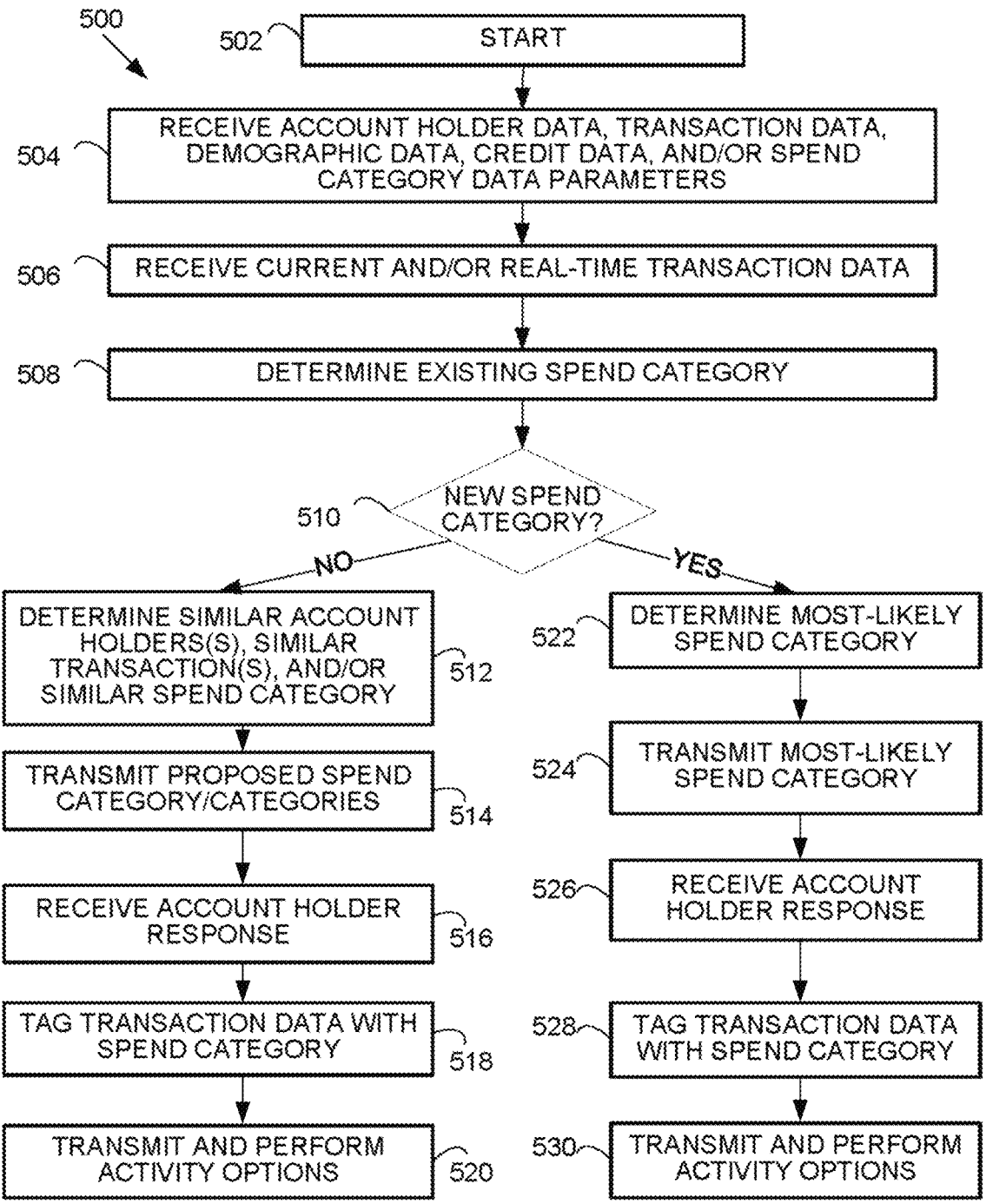
FIG. 5 is a flowchart illustrating an example method for providing personalized transaction learning and tagging, consistent with various embodiments.

FIG. 5 depicts an example method performed using, for example, the systems described in FIGS. 1 through 4. The method may begin at block 502. At block 504, a categorization system, which may be similar to categorization system 140, may receive account holder data including transaction history data, account holder profile data, demographic data, credit data, and/or spend category data.

Account holder data may be received for one or more financial accounts belonging to an account holder, whether the account holder be the primary, secondary, or a related account holder, such as a spouse, parent, guardian, and the like. Account holder data may include transaction data associated with all accounts belong to and/or associated with an account holder. Transaction data may for example, transaction date, transaction time, transaction amount, merchant name, merchant location, merchant identifier, account number used in transaction, SKU-level transaction information, and/or other purchase identifiers (e.g., merchant-provided product/service name, account holder-provided product/service name, and the like).

Transaction data may be received though an application programming interface ("API") associated with a financial institution housing the account belonging to or associated with the account holder. Transaction data also may be received by scanning a transaction receipt, using optical character recognition ("OCR") to recognize the characters on the receipt and/or receiving transaction data via a barcode, a quick response ("QR") code, or the like from the receipt. The transaction data received via a scanned receipt may include SKU-level data to identify each item included in a purchase. Transaction data also may be received through a mobile device and/or other computing device capable of participating in an account holder's transaction. For example, a computing device may conduct a transaction with an online retailer over an Internet connection and receive a digital receipt, which the computing device may transmit to a categorization system. As another example, a mobile device may conduct a transaction using, for example, near-field communication ("NFC") technology and, upon approval of the transaction, the mobile device may receive a receipt of transaction data to transmit to a categorization system.

Account holder data also may include demographic data, credit data, and account holder profile data. Demographic data may include, for example, age, gender, income level, household data (e.g., number of people living at a household, age of people living at a household, and the like), type of housing (e.g., mobile home, single-family house, apartment, condominium, boat, recreational vehicle, automobile, and the like), education data (e.g., highest level of education obtained, whether an account holder is currently enrolled in school, and the like), ancestry and/or ethnic origin(s), language(s) spoken, employment data (e.g., employer, occupation, full-time/part-time employment, and the like), marital status, and/or children data (e.g., number of children, ages of children, whether children reside with the account holder, and the like).

Credit data may include, for example, a credit score, a number of financial accounts associated with the account holder and what type of financial account (e.g., credit, debit, and the like), bill-payment history data, length of available credit being used, recent credit activity, and/or debt data (whether the account holder has been referred for collection, foreclosure or bankruptcy). Account holder profile data may include account holder name, address, telephone number, email address, account number(s), secondary account holders associated with each account (e.g., a child, a spouse, and the like), related account(s) (e.g., accounts belonging to a child, accounts belonging to a spouse, and the like), account transaction data, account status (e.g., amount of money and/or credit available in an account, payments due to the account, and the like), and/or spend categories that are used to tag transactions made by the account holder.

Spend category data may include a spend category created by account holder. Spend category data may include parameters to define a spend category. For example, spend category data may include a budget, date parameters, merchant parameters, location parameters, account parameters, SKU parameters, and notification data. Notification data may be used to determine and activity after a new transaction is added to the spend category as described herein.

In block 506, a categorization system may receive current and/or real-time transaction data. Current and/or real-time transaction data may be received in a manner as described above with respect to prior account holder data.

Once the system receives the transaction data, the system may determine whether a spend category exists relating to the transaction data in block 508. By way of example, a categorization system using a categorization module may analyze the transaction data to determine if similar transaction data associated with the account holder is tagged with a specific spend category. Similar transaction data may be determined by comparing, for example, merchant data, transaction date, transaction location information, and/or SKU-level data to determine if the previously tagged transaction data matches any current and/or real-time transaction data. Categorization system, using a categorization subsystem, may also compare transaction data with spend category parameters to determine if a transaction falls within a predetermined spend category. As another example, a spend category may be created by allowing a user to select historical transaction data and create a spend category for the historical transaction data. In this manner, the categorization system, using the categorization subsystem may analyze the transaction data associated with the spend category to determine similarities in the transaction data (e.g., transaction location, merchant name, transaction date(s), and the like) and the categorization module may set spend category parameters based on the similarities in the transaction data.

If no similarities, or not enough similarities to surpass a predetermined threshold level of similarities, exist in transaction data are determined between previously tagged transaction data and/or spend category data and the current and/or real-time transaction data, the system may determine that a new spend category is necessary in block 510. When a new spend category is determined for the particular account holder, the categorization system may search for similar transactions made by similar account holders and/or similar spend categories stored by similar account holders (block 512).

A similar account holder may be determined by comparing transaction data, demographic data, credit data, and account holder profile data of one account holder with another account holder to determine how many similarities exist between the two account holders. A similar spend category may be determined by comparing the current and/or real-time transaction data to the spend category parameters associated with spend categories set up by similar account holders. In either determination, if the number of similarities is above a predetermined threshold, the two account holders may be marked as similar account holders. For example, where a first account holder has more than two, five, or ten demographic characteristics in common with a second account holder, the two account holders may be marked as similar account holders depending on the predetermined threshold. As another example, current and/or real-time transaction data may match a number of spend category parameters set by a similar account holder such that the number of spend category parameters matched is above a predetermined threshold.

Moreover, the categorization system may require that specific account holder datum of the account holder data match in order for the account holders to be considered similar. For example, the categorization system may require that the account holder age, account holder country, account holder income, and the like match in order for a first account holder and a second account holder to be marked as similar. Similarly, the categorization system using the categorization module may require that specific spend category parameters match the current and/or real-time transaction data in order for the spend category to be proposed. For example, the categorization module on the categorization system may require that the transaction data match date parameters (e.g., a start date and end date), merchant parameters (e.g., merchant name, merchant type, and the like), and other spend category parameters of a similar account holder's spend category.

Similar transactions may also be determined by comparing transaction data of a first account holder with transaction data of a second account holder. If the number of similarities between transaction data for the first account holder and the second account holder is above a predetermined threshold, the transactions may be marked as similar transactions. Moreover, the categorization system may require that specific transaction datum of the transaction data match in order for the transaction data to be considered similar. For example, the categorization system may require that the merchant name match from one transaction data to the other in order for the first transaction data and the second transaction data to be marked as similar.

Once the categorization system determines similar transactions made by similar account holders, the categorization system may propose a spend category and/or a number of spend categories to the account holder based on the similar transaction(s) and/or similar account holder(s) in block 514. For example, a similar account holder may have similar transaction data (e.g., may have made a transaction for the same item and/or may have a number of transactions from the same merchant), where the similar account holder has tagged the similar purchase(s) as "2014 Kitchen Remodel." A categorization system may transmit a proposed category to the first account holder via an account holder device suggesting that the transaction may be tagged as a "2014 Kitchen Remodel." If the first account holder accepts the proposed category via then first account holder device, the system may create the new spend category for the first account holder and save the transaction tag and transaction data associated with the spend category in the categorization system data storage, for example data storage 146.

In order to create a new spend category, the system may adopt at a minimum the spend category parameters associated with the spend category of the similar account holder that matches the transaction data associated with the newly tagged transaction. For example, if a similar user has created the category of "2014 Kitchen Remodel" for all transaction from Jan. 1, 2014 to Dec. 31, 2014 made at home improvement stores using an account holder transaction card and the first account holder has a transaction made in that time range at a home improvement store, but with his or her own transaction card, the system may create a category of "2014 Home Improvements" for the first account holder with only the date parameters and the merchant type parameter (not the specific transaction card parameter). The system may store the spending category and spending category parameters and associate this data with the account holder who has confirmed to use the spend category to tag transactions. Moreover, the system may store (either with each tagged transaction data or as a pointer to the spend category) and association between the spend category and the transaction data that is tagged with the spend category.

Figure 10:
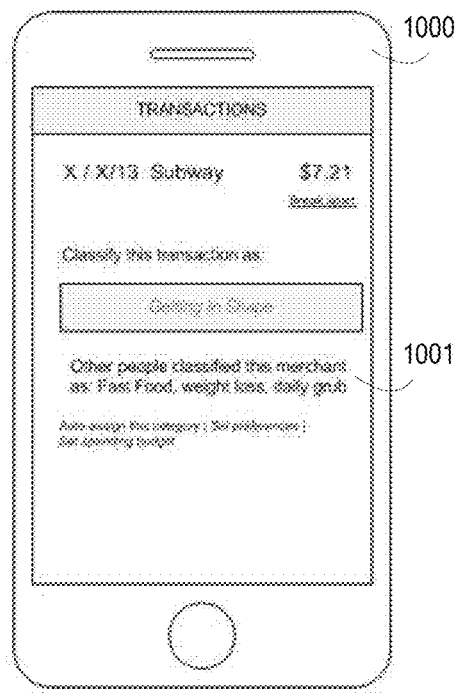
FIG. 10 is a screenshot illustrating an example system, method, and interface for providing personalized transaction learning and tagging, consistent with various embodiments.
Figure 11:
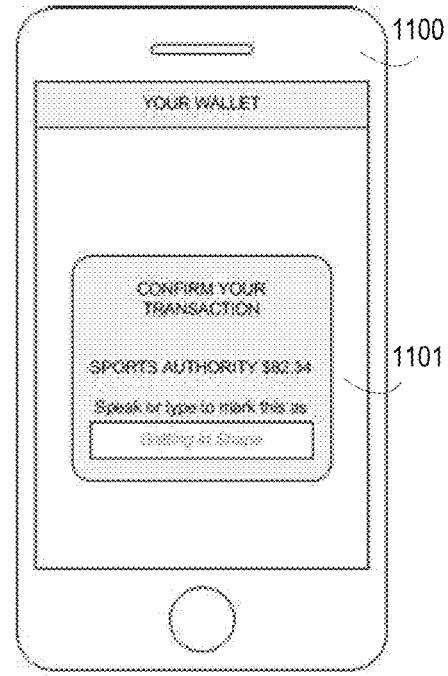
FIG. 11 is a screenshot illustrating an example system, method, and interface for providing personalized transaction learning and tagging, consistent with various embodiments.
Figure 12:
FIG. 12 is a screenshot illustrating an example system, method, and interface for providing personalized transaction learning and tagging, consistent with various embodiments.

At block 516, the categorization system may receive an account holder response via an account holder device. A response may include a confirmation of a spend category, a denial of a spend category, and/or a manual input of a spend category. If the account holder confirmed the spend category tag, a categorization system via a categorization module may tag the transaction data with the spend category information and save the transaction data and spend category tag for later analysis in the categorization system data storage (e.g., data storage 146). If the account holder denies the spend category tag, the categorization system, using a categorization module, may determine a second proposed spend category for the transaction in a similar manner as described above with respect to determining a proposed spend category and ask the account holder to confirm, deny, and/or manually input a spend category tag again. The system using a categorization module may continuously determine a proposed spend category as long as the account holder requests the system to do so. The categorization system may present multiple proposed spend categories for the account holder to select. The system may present the multiple proposed spend categories every time or in response to a denial of a first proposed spend category. The system also may enable changes to spend categories such that a user could revise the name of a spend category and/or reclassify and/or retag transactions A manual input of a spend category may include a manual selection of a preexisting spend category or a manual input of a new spend category. For example, the interface illustrated in FIG. 9 allows a user device to receive a selection according to a particular transaction using drag-and-drop technology. As another example, FIG. 10 illustrates an interface that allows a user device to receive a manual input tag to associate with transaction data. Additionally, a categorization system may provide suggested tags to associated with transaction data by determining a most likely spend category. FIG. 11 illustrates another example of an interface that allows a user device to manually associate a tag with transaction data by receiving audio or textual input. As another example, FIG. 12 illustrates a scanned receipt that allows a user to manually associate a tag with transaction data (e.g., an entire transaction and/or specific items of a transaction) using drag-and-drop technology.

If an account holder manually tags transaction data, the system may store the tag and category information, and search for similar transactions of the account holder that have not been tagged. If similar account holder transactions that have not been tagged are found, the system may present the transaction data associated with the similar transactions to the account holder and request that the account holder confirm or deny that transaction data should be tagged with the new spend category.

Once an account holder has confirmed and/or manually input a spend category associated with a transaction or multiple transactions, the categorization system using a categorization module may tag the transaction data with the spend category selected and/or input by the account holder at block 518.

At block 520, the categorization system may present a number of activity options based on the categorized transactions. For example, the account holder may visualize the categorized data using an account holder device, where the visualization is transmitted from the categorization system to the account holder device, compare the categorized data to a predetermined budget associated with the tagged category, receive an alert indicating an amount spent from a categorization system, receive a percentage of predetermined budget used from a categorization system, and/or receive a remaining amount when the amount spend is compared to the predetermined budget from a categorization system. A categorization system may also prepare an expense report and/or prepare reporting summarizing categorized spending and/or rewards accumulated according to the tag(s) for the account holder and transmit the expense report and/or other report to the account holder device. Example summarizations are presented in, for example, FIGS. 6 through 8.

For example, where a first account holder has a "Back to School" spend category and a second similar account holder has a "School Time" spend category, the system may compare transaction data associated with the two categories. Accordingly, in this example, where the first account holder conducts a transaction at a store that sells computers and other electronics, the system may compare the transaction data to the "Back to School" transaction data, which may include recent transactions at office supply stores and retail stores as well as the "School Time" transaction data associated with the second similar account holder, which may include recent transaction at a computer and electronics store. The system may then tag the computer transaction of the first account holder as "Back to School" based on the similar transaction tagged as "School Time" for the second similar account holder.

If, at block 510, it is determined that a spend category exists that is most-likely associated with a current and/or real-time transaction, the method executed by a categorization module may determine that this spend category to be a most-likely spend category (block 522).

A most-likely spend category may be determined by analyzing previously stored transaction data associated with the account holder to determine a number of similarities between previously stored transaction data and current and/or real-time transaction data. For example, a categorization system using a categorization module may determine a most-likely match for the spend category based on the transaction data, such as the transaction date, the merchant information, SKU-level data, the transaction location, and/or other transaction data. For example, if an account holder has categorized recent transactions at office supply stores and retail stores as "Back to School" spending, the system may determine that a transaction taking place within a time-frame close to transactions tagged as a "Back to School" category at a retail store in a location close to the recent transactions is likely to be categorized as "Back to School" as well. The categorization module of the system may determine a most-likely match for the spend category based further on account holder demographic data, credit data, and profile data associated with the account holder or a similar account holder.

At block 524, the system may transmit a prompt to an account holder device to prompt the account holder to confirm, deny, and/or manually input the category tag associated with the transaction data in block 526. If the account holder confirmed the spend category tag, a categorization system via a categorization module may tag the transaction data with the spend category information and save the transaction data and spend category tag for later analysis in the categorization system data storage (e.g., data storage 146). If the account holder denies the spend category tag, the categorization system, using a categorization module, may determine a second most-likely spend category for the transaction in a similar manner as described above with respect to determining a most-likely spend category and ask the account holder to confirm, deny, and/or manually input a spend category tag again. An account holder device also may deny the most-likely spend category and request that the categorization system, using the categorization module, determine a proposed spend category in the manner described above.

The system using a categorization module may continuously determine a most-likely and/or proposed spend category as long as the account holder requests the system to do so. The categorization system may present multiple most-likely and/or proposed spend categories for the account holder to select. The system may present the multiple most-likely and/or proposed spend categories every time or in response to a denial of a first most-likely spend category.

A manual input of a spend category may include a manual selection of a preexisting spend category or a manual input of a new spend category. If an account holder manually tags transaction data, the system may store the tag and category information, and search for similar transactions of the account holder that have not been tagged. If similar account holder transactions that have not been tagged are found, the system may present the transaction data associated with the similar transactions to the account holder and request that the account holder confirm or deny that transaction data should be tagged with the new spend category.

Once an account holder has confirmed and/or manually input a spend category associated with a transaction or multiple transactions, the categorization system using a categorization module may tag the transaction data with the spend category selected and/or input by the account holder at block 528. The categorization system also may enable an account holder to reclassify and/or retag transactions at a later time.

At block 530, the categorization system may transmit a number of activity options based on the categorized transactions to an account holder device. For example, the account holder may visualize the categorized data using an account holder device, where the visualization is transmitted from the categorization system to the account holder device, compare the categorized data to a predetermined budget associated with the tagged category, receive an alert indicating an amount spent from a categorization system, receive a percentage of predetermined budget used from a categorization system, and/or receive a remaining amount when the amount spend is compared to the predetermined budget from a categorization system. A categorization system may also prepare an expense report and/or prepare reporting summarizing categorized spending according to the tag(s) for the account holder and transmit the expense report and/or other reports based on budgeting and/or rewards accumulated to the account holder device. Example summarizations are presented in, for example, FIGS. 7, 8, and 13.

Figure 6:
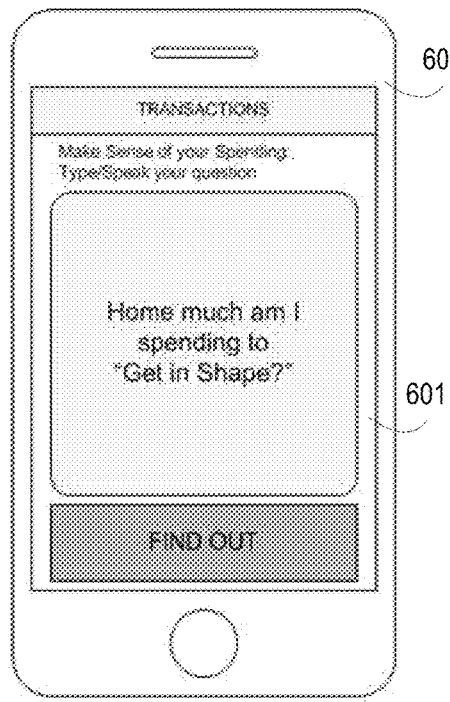
FIG. 6 is a screenshot illustrating an example system, method, and interface for providing personalized transaction learning and tagging, consistent with various embodiments.

As illustrated in FIG. 6, a user device 600 may transmit a request to a categorization system in order to receive calculated transaction data categorized according to the personalized tagging functionality described above. For example, FIG. 6 illustrates a request 601 associated with the personalized category for "Get in Shape." Once a user device 600 transmits this request, a categorization system may perform the method and/or a part of the methods described above to determine a personalized category for "Get in Shape" and an amount spent in the category "Get in Shape."

Figure 7:
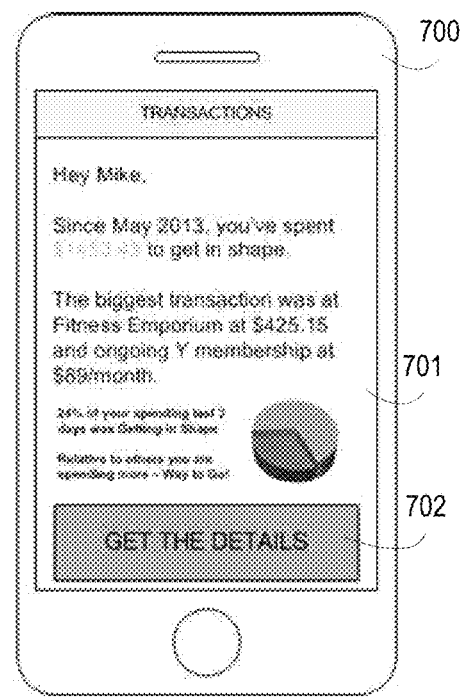
FIG. 7 is a screenshot illustrating an example system, method, and interface for providing personalized transaction learning and tagging, consistent with various embodiments.

FIG. 7 illustrates a user device 700 that displays an example transaction summary 701. As illustrated in transaction summary 701, the user device may present a visual summary report regarding the user "Get in Shape" spend category. A user may interact with a "Get the Details" interface 702 to review transaction details regarding the spend category.

Figure 8:
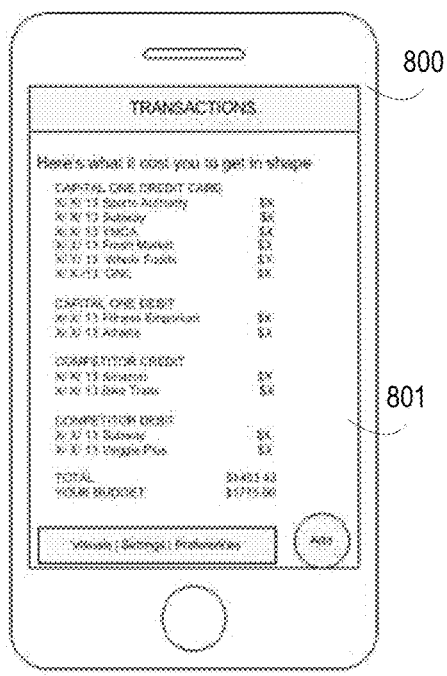
FIG. 8 is a screenshot illustrating an example method for providing personalized transaction learning and tagging, consistent with various embodiments.

FIG. 8 illustrates a user device 800 that displays example transaction details 801. As illustrated in FIG. 8, transaction details for transactions associated with multiple financial institutions may be displayed.

Figure 9:
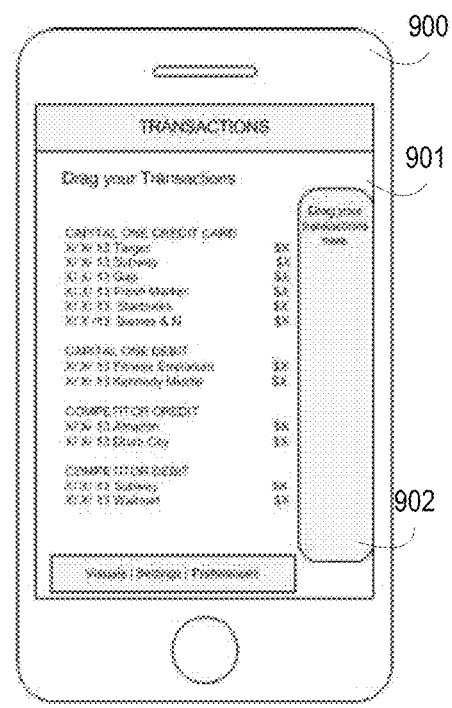
FIG. 9 is a screenshot illustrating an example system, method, and interface for providing personalized transaction learning and tagging, consistent with various embodiments.

FIG. 9 illustrates a user device 900 that displays an example interface 901 that enables a user to associate various transactions with a spend category. For example, a user can interact with interface 901 to "drag" various associated transactions into region 902. A categorization system, API and categorization subsystem may then interact to categorize the transactions.

FIG. 10 illustrates a user device 1000 that displays an example interface 1001 that enables a user to categorize a particular transaction. FIG. 11 illustrates a user device 1100 that displays an example interface 1101 enables to user to confirm a particular transaction is to be associated with a particular category.

FIG. 12 illustrates a user device 1200 that displays an example interface 1201 that enables a user to categorize transactions based on a receipt. For example, a user may interact with interface 1201 to identify which items listed on a receipt are to be associated with a particular spend category.

Figure 13:
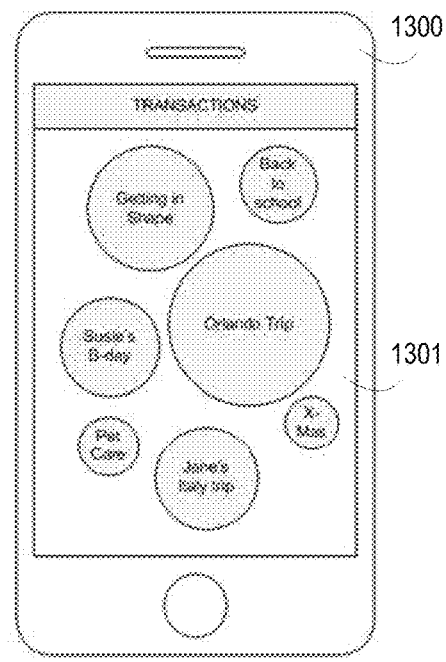
FIG. 13 is a screenshot illustrating an example system, method, and interface for providing personalized transaction learning and tagging, consistent with various embodiments.

FIG. 13 illustrates a user device 1300 that displays a visualization report 1301 of a user's spend categories. As illustrated in visualization report 1301, different spend categories may be depicted differently (e.g., based on size) to illustrate the relative and comparative spend associated with each spend category. For example, where the "Orlando Trip" is depicted as a larger circle than "Back to School," the user may interpret that to mean there is more money spent on the Orlando Trip than Back to School.

Unlike existing transaction categorization, the present system allows the user to define what transaction details are relevant to tagging a transaction with a particular spend category. For example, when an account holder takes a vacation or a business trip, the transaction data that may be important in determining whether the transaction data is to be categorized as "Vacation" or "Work Trip to Dallas" may be the transaction date, the transaction location, and/or the merchant (e.g., a travel agent, an airline, a hotel chain, and the like). As another example, when an account holder is purchases school supplies, the transaction data that may be important in determine whether the transaction data is to be categorized as "School Supplies" may include a transaction date, a merchant type, a merchant name, and/or a transaction location. These examples are merely illustrative, and transactions may be categorized according to any data described herein.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, processors, etc.) separately. The functions described as being performed at various components may be performed at other components, and the various components bay be combined or separated. Other modifications also may be made.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It may be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It may be further understood by those within the art that if a specific number of an introduced claim recitation is intended, such an intent may be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It may be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" may be understood to include the possibilities of "A" or "B" or "A and B."

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise, various steps may be omitted, repeated, or combined, as necessary, to achieve the same or similar objectives. Accordingly, the invention is not limited to the above-described embodiments, but instead is defined by the appended claims in light of their full scope of equivalents.

In the preceding specification, various preferred embodiments have been described with references to the accompanying drawings. It may, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

What is claimed is:

1. A method comprising:
    receiving, at a categorization system, current transaction data associated with a first financial account, the current transaction data comprising a receipt including a plurality of line items and a total, each line item of the plurality of line items including a product or a service and an associated cost for the product or the service;
    determining, using the categorization system, whether the current transaction data has at least a threshold number of similarities with a previous transaction associated with the first financial account;
    receiving, via a network, first demographic data for a first account holder associated with the first financial account when a number of similarities between the previous transaction and the current transaction data is below the threshold number of similarities;
    comparing, via the categorization system, the current transaction data with transaction data associated with a second account holder;
    comparing, via the categorization system, the first demographic data with a second demographic data for the second account holder;
    determining, using the categorization system, a first spend category for the current transaction data, the first spend category being identified by the categorization system as a most likely spend category based on the threshold number of similarities with the previous transaction;
    tagging, using the categorization system, the current transaction data with the first spend category;
    preparing a visualization report to include the plurality of line items tagged with the first spend category and the total;
    transmitting, via the network, the visualization report to a graphical user interface;
    receiving, via the network, a first request to retag a first line item of the plurality of line items from the first spend category to a different spend category; and
    retagging, using the categorization system, the first line item from the first spend category to the different spend category by moving the first line item from the plurality of line items to a different area in the graphical user interface while other line items of the plurality of lines items remain in the first spend category,
    wherein determining the first spend category for the current transaction data is further based upon comparing (i) the current transaction data and the transaction data associated with the second account holder and (ii) the first demographic data and the second demographic data.

2. The method of claim 1, wherein determining the first spend category for the current transaction data based on the threshold number of similarities comprises comparing merchant data, transaction date, transaction location information, and/or stock-keeping unit level data between the current transaction data and the previous transaction.

3. The method of claim 1, wherein the threshold number of similarities between the current transaction data and the previous transaction are based upon transaction location, merchant name, and/or transaction date.

4. The method of claim 1, wherein the first demographic data and the second demographic data include at least one of age, gender, income level, household data, type of housing, education data, ancestry, ethnic origin(s), language(s) spoken, employment data, marital status, or dependent data.

5. The method of claim 1, wherein the step of determining whether the current transaction data has the threshold number of similarities with the previous transaction comprises:
    comparing a first merchant type associated with the current transaction data with a second merchant type for the previous transaction; and
    comparing a first time stamp associated with the current transaction data with a second time stamp for the previous transaction.

6. The method of claim 1, further comprising:
    receiving, at the categorization system, a denial indicating that the first spend category is incorrect; and
    transmitting, via the network, a second request for manual input of a new spend category.

7. The method of claim 1, wherein the first request to retag the first line item is received, via the network and the graphical user interface, using drag-and-drop technology.

8. A system, comprising:
  data storage that maintains historical transaction data received from a plurality of financial institutions through a financial institution application programming interface (API); and
  a categorization system connected to the data storage, wherein the categorization system comprises a processor and memory storing instructions that, when executed by the processor, causes the processor to:
    receive, via a network and from an account holder device, current transaction data associated with a first financial account, the current transaction data comprising a receipt including a plurality of line items and a total, each line item of the plurality of line items including a product or a service and an associated cost for the product or the service;
    determine whether the current transaction data has a threshold number of similarities with the historical transaction data for the first financial account by comparing the current transaction data with the historical transaction data for the first financial account;
    receive, via the network and when a number of similarities between the historical transaction data and the current transaction data is below the threshold number of similarities, first demographic data for a first account holder associated with the first financial account;
    compare the current transaction data with transaction data associated with a second account holder;
    compare the first demographic data with a second demographic data for the second account holder;
    determine a first spend category for the current transaction data, the first spend category being identified by the categorization system as a most likely spend category based on the threshold number of similarities with the historical transaction data;
    tag the current transaction data with the first spend category;
    prepare a visualization report to include the plurality of line items tagged with the first spend category and the total;
    transmit, via the network, the visualization report to a graphical user interface;
    receive, via the network and the graphical user interface, a first request to retag a first line item of the plurality of line items from the first spend category to a different spend category; and
    retag the first line item from the first spend category to the different spend category by moving the first line item from the plurality of line items to a different area in the graphical user interface while other line items of the plurality of lines items remain in the first spend category,
    wherein determining the first spend category for the current transaction data is further based upon comparing (i) the current transaction data and the transaction data associated with the second account holder and (ii) the first demographic data and the second demographic data.

9. The system of claim 8, wherein the instructions, when executed by the processor, further cause the processor to determine the threshold number of similarities by comparing merchant data, transaction date, transaction location information, and/or stock-keeping unit level data between the current transaction data and the historical transaction data.

10. The system of claim 8, wherein the threshold number of similarities between the current transaction data and the historical transaction data are based upon transaction location, merchant name, and/or transaction date.

11. The system of claim 8, wherein the first demographic data and the second demographic data include at least one of age, gender, income level, household data, type of housing, education data, ancestry, ethnic origin(s), language(s) spoken, employment data, marital status, or dependent data.

12. The system of claim 8, wherein the instructions, when executed by the processor, further cause the processor to determine whether the current transaction data has the threshold number of similarities with the historical transaction data by:
  comparing a first merchant type associated with the current transaction data with a second merchant type included in the historical transaction data; and
  comparing a first time stamp associated with the current transaction data with a second time stamp included in the historical transaction data.

13. The system of claim 8, wherein the instructions, when executed by the processor, further cause the processor to receive the first request to retag the first line item, via the network and the graphical user interface, using drag-and-drop technology.

14. A system comprising:
  a categorization system comprising a first processor and a first memory storing first instructions that, when executed by the first processor, causes the first processor to:
    receive, via a network, current transaction data associated with a first financial account, the current transaction data comprising a receipt including a plurality of line items and a total, each line item of the plurality of line items including a product or a service and an associated cost for the product or the service;
    determine whether the current transaction data has a threshold number of similarities with historical transaction data for the first financial account by comparing the current transaction data with the historical transaction data for the first financial account;
    determine a first spend category for the current transaction data, the first spend category being identified by the categorization system as a most likely spend category based on the threshold number of similarities with the historical transaction data;
    receive, via the network and when a number of similarities between the historical transaction data and the current transaction data is below the threshold number of similarities, first demographic data for a first account holder associated with the first financial account;
    compare the current transaction data with transaction data associated with a second account holder;
    compare the first demographic data with a second demographic data for the second account holder;
    prepare a visualization report to include the plurality of line items tagged with the first spend category and the total;
    transmit, via the network, the visualization report to a graphical user interface;
    retag a first line item from the first spend category to a different spend category in response to receiving a first request, the retagging comprising moving the first line item from the plurality of line items to a different area in the graphical user interface while other line items of the plurality of lines items remain in the first spend category; and a computing device operating an application and configured to:
  generate the graphical user interface;
  receive, at an input/output device, an indication that a user wishes to retag the first line item of the plurality of line items from the first spend category to the different spend category; and
  transmit, via the network, the first request to retag the first line item of the plurality of line items on the receipt from the first spend category to the different spend category,
  wherein determining the first spend category for the current transaction data is further based upon comparing (i) the current transaction data and the transaction data associated with the second account holder and (ii) the first demographic data and the second demographic data.

15. The system of claim 14, wherein the application, when executed by the computing device, further cause the computing device to receive the indication that the user wishes to retag the first line item via drag and drop technology.

16. The system of claim 14, wherein the first instructions, when executed by the first processor, further cause the first processor to determine the threshold number of similarities by comparing merchant data, transaction date, transaction location information, and/or stock-keeping unit level data between the current transaction data and the historical transaction data.

* * * * *